Dec. 3, 1968

E. R. WELLS 3,414,459

COMPRESSIBLE LAMINATED PAPER STRUCTURE

Filed Feb. 1, 1965

INVENTOR.
Edward R. Wells

BY *Richard C. Witte*

ATTORNEY

Dec. 3, 1968  E. R. WELLS  3,414,459
COMPRESSIBLE LAMINATED PAPER STRUCTURE
Filed Feb. 1, 1965  2 Sheets-Sheet 2

INVENTOR.
Edward R. Wells
BY *Richard C. Wittle*
ATTORNEY

United States Patent Office 3,414,459
Patented Dec. 3, 1968

3,414,459
COMPRESSIBLE LAMINATED PAPER STRUCTURE
Edward Ronald Wells, Cincinnati, Ohio, assignor to The Proctor & Gamble Company, Cincinnati, Ohio, a corporation of Ohio
Filed Feb. 1, 1965, Ser. No. 429,330
9 Claims. (Cl. 161—131)

ABSTRACT OF THE DISCLOSURE

Compressible laminated paper structures for use as paper toweling, paper tissues and other household papers. The compressible paper structures are formed by embossing identical raised patterns of discrete protuberances on two extensible paper sheets, adhesively joining the mated distal surfaces of the embossed protuberances and calendering the resulting laminated paper structure to improve compressibility and handle.

---

The present invention relates to compressible laminated paper structures and to the method for manufacturing same. In particular, the invention concerns a novel process for converting extensible papers, such as creped paper, into compressible laminated paper structures having embossed protuberances adhesively joined at their distal surfaces and the resulting paper structures.

Paper laminae have been accorded a variety of mechanical treatments, including creping, embossing and fluting, prior to adhesively combining them in nesting or non-nesting laminates. The resulting laminates have been employed for a diversity of purposes including packing materials and construction materials. Paper laminates have also been used as paper tissues, table napkins, place mats, towels and the like; hereinafter referred to as household papers.

In the manufacture of the latter materials, however, the use of nested laminae is undesirable for several reasons including decreased bulk per unit weight as compared with non-nested laminates and a harsher feel due in part to the loss of compressibility caused by the nesting of the paper laminae.

Applying the above-mentioned mechanical treatments to the paper laminae prior to laminating them in a non-nesting structure also tends to result in a stiff and still relatively incompressible laminate having a harsh surface feel which is objectionable to a person using the laminated product.

Applicant has discovered, however, that the foregoing objections to the use of non-nesting paper laminates as household papers can be alleviated by adhesively combining the distal surfaces of embossed protuberances of paper laminae and then calendering the resulting laminated paper structure.

It is, therefore, an object of this invention to provide an improved compressible laminated paper structure.

It is a further object of this invention to provide a method for manufacturing a compressible laminated paper structure.

It is another object of this invention to provide a bulky, soft, compressible laminated paper structure for use as household paper.

It is yet another object of this invention to provide a bulky, compressible laminated paper structure with a soft surface impression suitable for use as a paper towel.

With these general objects in view, and such others as may hereinafter appear, the present invention consists of a process for improving the softness, compressibility and handling qualities of a laminated paper structure and the household paper produced thereby, as is hereinafter described and particularly claimed at the end of this specification.

In the drawings which illustrate a preferred embodiment of the invention:

Figure 2:
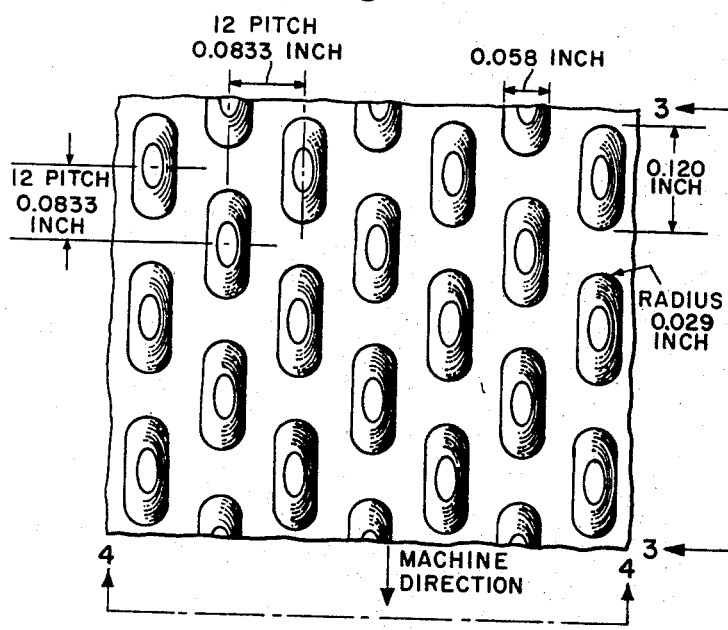
FIGURE 2 is an enlarged partial plan view of the surface of an embossing roll, illustrating a particularly preferred spacing and size of embossing protuberances, suitable for use in the equipment shown in FIGURE 1.
Figure 3:
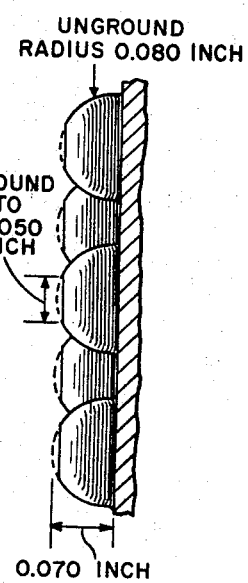
FIGURE 3 is a side elevation of FIGURE 2, taken along the line 3—3.
Figure 4:
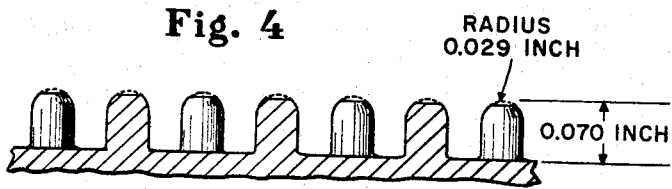
FIGURE 4 is a machine direction elevation of FIGURE 2, taken along line 4—4, which in combination with FIGURE 3 illustrates the shape and spacing of particularly preferable embossing protuberances suitable for use in the practice of the invention.
Figure 5:
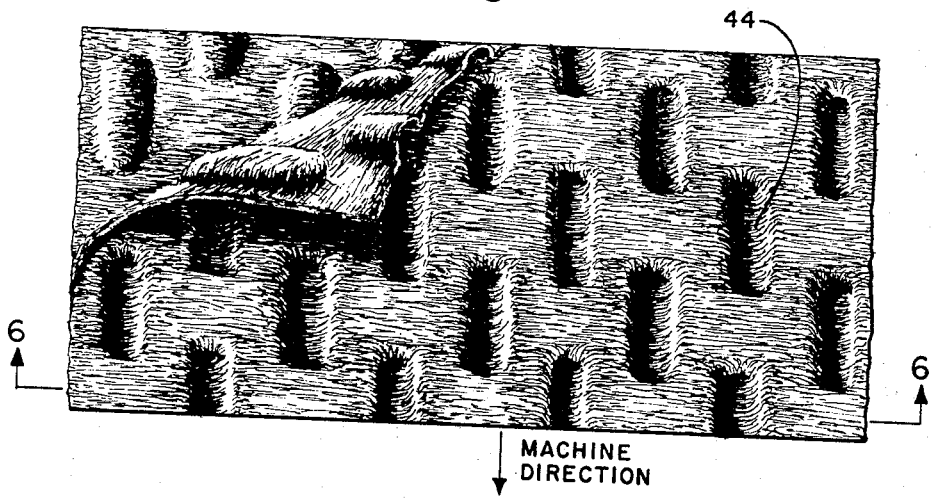

FIGURE 5 is an enlarged partial plan view of the surface of the compressible laminated paper structure, resulting from carrying out the present process with the embossing roll surface illustrated in FIGURES 2, 3 and 4, wherein the upper left-hand corner of the top paper laminae is delaminated and turned back to further illustrate the structure. FIGURE 5 illustrates the reverse side of the embossed protuberances which appear on the surface of the present compressible laminated paper structure.

Figure 6:
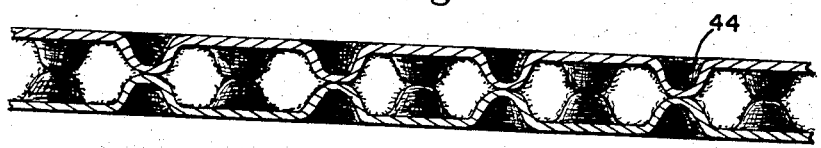

FIGURE 6 is an enlarged cross section of FIGURE 5, taken along line 6—6, which further illustrates the nature of the present compressible laminated paper structure. FIGURE 6 shows the particularly preferred embossed protuberances 44 generated by the embossing roll surface shown in FIGURES 2, 3 and 4 and illustrates the indexing of the adhesively joined distal surfaces of the embossed protuberances 44 in the compressible laminated paper structure illustrated in FIGURE 5.

Figure 7:
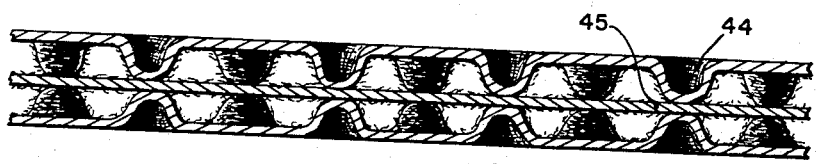

FIGURE 7 is an enlarged cross section of another compressible laminated paper structure having a surface appearance identical to that illustrated in FIGURE 5, but containing a third paper lamina 45 of extensible paper interposed between and adhesively joined to the distal surfaces of the embossed and indexed protuberances 44 of the two, outer paper laminae.

The compressive modulus values, referred to herein, define the compressive deformation characteristics of a paper sheet or structure compressively loaded on its opposing surfaces. The significance of the compressive modulus values are better understood by the realization that they are computed by dividing the force applied to compress the sheet by the fractional amount of compressive deformation occurring. A higher compressive modulus indicates, therefore, a paper sheet or structure which exhibits less fractional reduction in caliper when subjected to compressive loading. Paper sheets or structures having lower compressive modulus values convey an impression of softness and sponginess to a person handling them.

An Instrom Tester (Model No. TM, Ser. No. 261) was used to obtain the stress-strain plots from which the reported compressive modulus values were calculated. A single sheet of the paper sheet or structure to be tested was placed between compression plates having an area of four square inches. The sample was then loaded on its opposing surfaces by forcing the compression plates together at a rate of 0.02 inch of compressive deformation per minute until the loading per square inch reached 125 grams.

The Instrom Tester was equipped with a recording unit which graphs the stress-strain curve of the test sample with stress in grams/square inch as the X axis and strain in inches/inch as the Y axis. The compressive modulus values reported herein in inch-grams/cubic inch are the slopes of the recorded stress-strain curves calculated at the point on the curve where the loading was 100 grams/ square inch.

The Handle-O-Meter values (HOM), referred to herein, define the stiffness or handle of a paper sheet or structure and, together with compressive modulus values, give a further indication of the softness impression obtained by a person who handles same. A higher numerical HOM value is indicative of increased stiffness and poorer handle.

A Handle-O-Meter (Model No. 211–3, Ser. No. 19506), as is in common use in the paper industry, was used to obtain HOM values by placing two 4 inch by 4 inch samples on the specimen platform, set to a specimen slot width of 0.3750 ± 0.0005 inch, and depressing the penetrator beam of the Handle-O-Meter into the specimen slot. The machine direction (MD) and cross-machine direction (CD) HOM values reported herein were obtained, respectively, from separate tests by placing samples with their machine and cross-machine direction across the slot.

HOM readings were taken directly from the calibrated meter of the Handle-O-Meter as the maximum force in grams required to force the penetrator of the Handle-O-Meter tester and the paper sample into the specimen slot. The final HOM values were calculated by averaging four replicate tests, multiplying by 8 and dividing the resulting number by the paper sample length in inches.

Broadly speaking, the process of the present invention comprises the steps of (1) passing two continuous creped, or otherwise extensible, paper sheets between separate embossing rolls to form identical raised patterns of discrete embossed protuberances thereon, (2) indexing and adhesively joining the distal surfaces of the protuberances so formed on the two sheets directly or with a third paper sheet interposed and (3) calendering the resulting laminated paper sctructure to improve its compressibility and handle.

Figure 1:
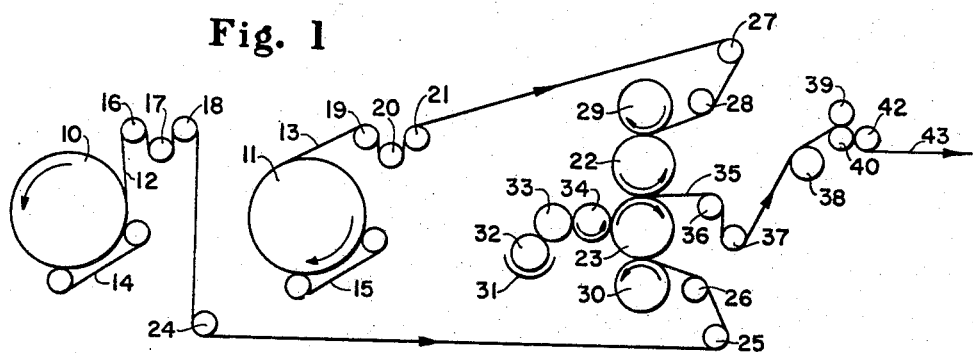
FIGURE 1 is a schematic drawing of the side elevation of equipment for carrying out a preferred embodiment of the present process.

Referring now to FIGURE 1 of the drawings, one embodiment of equipment for carrying out the process of the invention comprises two parent rolls 10 and 11 having wound thereon a supply of extensible paper 12 and 13.

To insure a constant sheet speed, parent rolls 10 and 11 are mechanically driven by belts 14 and 15 operating against the surface of parent rolls 10 and 11, although any suitable means of insuring constant and synchronized speed for the extensible paper sheets 12 and 13 as they unwind from parent rolls 10 and 11 can be employed.

As the continuous extensible paper sheets 12 and 13 unwind from parent rolls 10 and 11, they pass separately over sets of tension indicating rolls 16, 17 and 18 and 19, 20 and 21, respectively. Tensioning control by speed adjustment provides means of maintaining the extensible paper sheets 12 and 13 in arcuate contact with the steel embossing rolls 22 and 23, respectively, so that indexing of the embossed protuberances is achieved during subsequent lamination in the nip formed by the steel embossing rolls.

After paper sheets 12 and 13 pass separately over the sets of tensioning rolls 16, 17 and 18 and 19, 20 and 21, respectively, the extensible paper sheet 12 passes around the return rolls, 24, 25 and 26. Extensible paper sheet 13 passes around return rolls 27 and 28.

From return rolls 27 and 28, the extensible paper sheet 13 is embossed by passing through the nip formed by the steel embossing roll 22 and a rubber covered roll 29. From return rolls 24, 25 and 26, the extensible sheet 12 is embossed by passing through the nip formed by the steel embossing roll 23 and a rubber covered roll 30.

An identical embossed pattern of discrete protuberance is formed on sheets 12 and 13 by the action of the nips formed by the steel embossing rolls 23 and 22 and the rubber covered rolls 30 and 29, respectively.

Extensible sheets 12 and 13 remain in arcuate contact with the embossing pattern on the steel embossing rolls 23 and 22 respectively as they revolve. The steel embossing rolls 22 and 23 are positively driven by gears at identical surface speeds and the clearance in the nip between them is set so that the distal surfaces of the discrete protuberances formed on sheets 12 and 13 are indexed and compressed in the nip.

Roll 32 revolves in pan 31 to pick up adhesive for adhesively bonding extensible paper sheets 12 and 13 together at their respective distal surfaces, although the bonding can be accomplished by the inducement of pressure between the steel embossing rolls 22 and 23 alone, especially if a slight amount of water is present at the pressure bonding points.

The adhesive picked up from pan 31 by roll 32 is transferred to roll 33 and thereafter to roll 34. The use of the three rolls 32, 33 and 34 is not mandatory, but provides means for controlling the amount and evenness of adhesive transfer.

Roll 34 applies a light even coating of adhesive to the distal surfaces of the embossed protuberances on extensible sheet 12, which then come into contact with and are bonded to the indexed distal surfaces of the embossed protuberances on extensible sheet 13, to form a laminated paper structure 35.

The laminated paper structure 35 passes over tension rolls 36 and 37 and over return roll 38. From return roll 38 the laminated paper structure proceeds through the nip formed by calendering rolls 39 and 40 and through the nip formed by the calendering roll 40 and the draw roll 42 to result in the compressible laminated paper structure 43 of this invention.

In carrying out the process of the present invention, applicant selects at least two paper plies each having a basis weight of about 7 pounds to about 30 pounds, preferably about 16 pounds, per 3000 square feet. It is not necessary that the paper plies have the same basis weight, and applicant may combine paper plies of different basis weight. Applicant prefers an absorbent creped paper of the type generally referred to as toweling paper with a machine direction tensile and a cross-machine direction tensile of about 100 to about 1500, preferably about 700, grams per inch of paper width to provide the necessary strength for processing. The paper should also have a crepe percentage of about 15% to about 40%, or an equivalent extensibility provided by other suitable paper treatments to allow easy knob indexing by tension control. The final choice of paper for plies will, however, depend upon the characteristics desired in the compressible laminated paper structure, with the stipulation that the paper chosen must possess sufficient extensibility and strength to withstand the embossing and calendering operations without breaking.

The selected paper is embossed with a repeating pattern consisting of about 16 to about 200, preferably about 70, discrete protuberances per square inch, raised to a height of about 0.010 inch to about 0.040 inch, preferably about 0.020 inch, above the surface of the unembossed paper sheet. The embossing is conducted so that about 10% to about 60%, preferably about 45%, of the paper surface is raised.

As illustrated in FIGURE 1, a preferred apparatus embodiment of the present process contemplates embossing the individual paper plies by passing them through the nip formed by running a steel embossing roll against a rubber covered roll, but any embossing method which produces the disclosed degree and type of embossing is satisfactory for use in the process.

One particularly preferred embodiment of a steel embossing roll for use in the present process has certain protuberance dimensions and spacing, as illustrated in FIGURES 2, 3 and 4, but other embossing means resulting in paper plies having the embossed protuberance specifications set forth above can be employed to obtain the benefits of the process. Preferably the embossing roll protuberances have a flattened distal end structure because this shape allows embossing roll concentricity for accurate adjustment of nip clearance between the steel embossing rolls. The flattened distal end structure also results in excellent adhesive contact in the compressible laminated paper structure.

After the selected paper plies have been embossed, two of the embossed sheets are adhesively joined at the distal surfaces of their indexed embossed protuberances. The adhesive joinder can be accomplished by running the indexed and mating distal surfaces of the embossed paper plies together while they remain in arcuate contact with the embossing rolls as illustrated in FIGURE 1 to form the structure illustrated in FIGURES 5 and 6, and the adhesive joinder can be effected by pressure alone. A third paper ply can be interposed between the two embossed paper plies to form the structure illustrated in FIGURE 7.

Applicant prefers, however, to perfect the adhesive joinder by applying a total of about 0.01 to about 0.3 pound, preferably about 0.03 pound, of adhesive solids per 3000 square feet of adhesively joined extensible paper sheet surface to the distal surfaces of the embossed protuberances of the plies before effecting adhesive joinder. The adhesive solids can be conveniently applied, as a liquid formulation, to the distal surfaces of the embossed protuberances of one or both of contiguous paper plies.

One very satisfactory adhesive can be prepared by heating about 2 to about 4 parts by weight of substantially completely hydrolyzed polyvinyl alcohol resin in water to make up 100 parts by weight. Other adhesives commonly used in the paper industry including starches, starch-clay coating formulas, wet strength resins, polyvinyl acetates, dextrins, latices and cellulose gums are also suitable for use in practicing the invention.

After the embossed paper sheets are adhesively joined to form a laminated paper structure, the paper structure is run through at least one nip formed by two calender rolls, thereby increasing its compressibility or effecting a decrease in its compressive modules.

The calendering step decreases the caliper of the laminated structure to about 50% to about 90%, preferably about 60%, of the caliper of the laminated paper structure formed to result in the present compressible laminated paper structure.

Applicant has carried out the calendering step of the process by using a steel roll and a roll covered with soft rubber of about 10 to about 50, preferably about 30, Durometer A, at pressures of about 0.5 to about 60 pounds, preferably about 20 pounds, per linear inch. A felt covered steel roll run against a soft rubber covered roll has also been found satisfactory, and any calendering rolls effecting the disclosed reduction in caliper will achieve the benefits of the present process.

Operation of the process disclosed herein results in the manufacture of a soft, compressible, calendered laminated paper structure sheet having embossed paper plies with a total basis weight of about 14 to about 90 pounds per 3000 square feet. The distal surfaces of the protuberances of the embossed paper plies are indexed and adhesively joined. After calendering the adhesively joined surfaces and embossed protuberance side walls may show evidence of canting and compressive deformation.

Each of the outer plies is embossed with a repeating pattern consisting of about 16 to about 400, preferably about 70, inwardly directed discrete protuberances per square inch, and the compressible laminated paper structure exhibits a compressive modulus of about 200 to about 800, preferably about 400, inch-grams/cubic inch. The HOM values of the compressible laminated paper structure are about 10 to about 130, preferably about 30. A variation of the soft, compressible, calendered two-ply paper sheet can have a third paper ply interposed and adhesively joined between the indexed distal surfaces of the protuberances of the embossed paper plies.

Having described the process and product of this invention, the following examples are intended to illustrate modes of advantageous operation, but it will be understood that those skilled in the art will immediately be aware of other adavntages stemming from the herein disclosed inventive concept. It is understood, therefore, that the examples are intended to be illustrative and not limiting, and the scope of the invention is only to be construed by the scope of the appended claims.

Example I

Two paper sheets, each having a basis weight of 15.9 pounds per 3000 square feet, a machine direction tensile strength of 663 grams per inch and a cross-machine tensile strength of 384 grams per inch were selected as plies for use in a compressible laminated paper structure. The paper sheets also had 20% dry-crepe together with a machine direction extensibility to rupture of 29%.

The paper sheets were separately embossed with a raised pattern of discrete embossed protuberances by passing them individually through nips formed by steel embossing rolls and rubber covered embossing rolls mounted as illustrated in FIGURE 1 of the drawings.

In each set of rolls forming the embossing nips, the rubber covered roll had a P&J ⅛" ball hardness of 109 and a diameter of 12 inches; the active rubber covering was 0.875 inch thick. The steel embossing rolls had protuberances in a pattern on their surfaces engraved to the dimensions illustrated in FIGURES 2, 3 and 4 of the attached drawings. In each set of embossing rolls the 16 inch diameter steel embossing roll was pressed against the rubber covered roll with a force of 250 pounds per linear inch.

In the foregoing manner the two paper sheets selected as plies were embossed with a repeating pattern of 72 raised protuberances per square inch in the pattern of the embossing roll. The distal surfaecs of the embossed protuberances were raised 0.021 inch above the surface plane of the original paper sheets and constituted 45% of the total surface area.

Polyvinyl alcohol adhesive, prepared by heating 4 parts by weight of 99+% hydrolyzed polyvinyl alcohol resin in 96 parts by weight of water, was then applied to the distal surfaces of the embossed protuberances on the lower embossed paper sheet as the embossed paper sheet remained in traveling arcuate contact with the engraved steel protuberances on the embossing roll. The application of polyvinyl alcohol adhesive was accomplished with a three roll pick-up and metering system composed of rubber covered rolls as illustrated in FIGURE 1 of the drawings. The adhesive applicator roll was driven at the speed of the paper sheet and cleared the embossing pattern on the steel roll by 0.0015 inch, so that the distal surfaces of the protuberances embossed in the paper were just contacted. 0.03 pound of the polyvinyl alcohol adhesive was applied to the distal surfaces of the embossed protuberances on 3000 square feet of the paper sheet.

After the adhesive application, the upper and lower embossed paper sheets, remaining in arcuate contact on the identically patterned embossing rolls were brought into contact in the nip formed by the two steel embossing rolls so that the distal surfaces of the embossed protuberances were indexed and adhesively bonded.

After the embossed paper sheets were indexed and adhesively bonded at their indexed distal surfaces they were led to the nip formed by two calendering rolls, forced together with a loading of 21 pounds per linear inch. One of these calendering rolls was a felt covered steel roll; the other calendering roll was a soft, 32 Durometer A, rubber covered roll. The calendering action provided by the calendering rolls reduced the unloaded caliper of the laminated structure to 0.0332 inch or 63.3% of the caliper of the laminated structure. The resulting compressible laminated paper structure had a compressive modulus of 346 inch-grams per cubic inch as compared with a compressive modulus of 728 inch-grams per cubic inch for the laminated structure prior to calendering.

The MD/CD HOM values of the laminated paper structure prior to calendering were 72/68, after calendering the MD/CD HOM values were reduced to 36.5/31.0.

The compressible laminated paper structure formed by the process of Example I is highly suitable for use as a kitchen towel.

When calendered to an unloaded caliper of 0.0292 or 55% of the caliper of the laminated structure, the compressible laminated paper structure of Example I had a compressive modulus of 222 inch-grams per cubic inch and MD/CD HOM values of 28/23. The slightly softer and less bulky compressible laminated paper structure so formed was suitable for use as a paper towel.

A compressible laminated paper structure manufactured by the process of Example I, with the exception that the two paper plies have a basis weight of 7 pounds per 3000 square feet and are embossed with a repeating pattern of 200 raised protuberances per square inch, will be found especially useful as a table napkin.

Example II

Two paper sheets, each having a basis weight of 31.1 pounds per 3000 square feet, a machine direction tensile strength of 1375 grams per inch and a cross-machine tensile strength of 1055 grams per inch were selected as plies for use in a compressible laminated paper structure. The paper sheets had 20% dry-crepe together with a machine direction extensibility to rupture of 29%.

The paper sheets were separately embossed with a raised pattern of discrete embossed protuberances by passing them individually through nips formed by steel embossing rolls and rubber covered rolls mounted as illustrated in FIGURE 1 of the drawings.

In each set of rolls forming the embossing nips, the rubber covered roll has a P&J 1/8" ball hardness of 110 and a diameter of 8.5 inches; the active rubber covering was 0.875 inch thick. The steel embossing rolls had protuberances in a pattern on their surfaces engraved to the dimensions illustrated in FIGURES 2, 3 and 4 of the attached drawings. In each set of embossing rolls the 8 inch diameter steel embossing roll was pressed against the rubber covered roll with a force of 275 pounds per linear inch.

In the foregoing manner the two paper sheets selected as plies were embossed with a repeating pattern of 72 raised protuberances per square inch in the pattern of the embossing roll. The distal surfaces of the embossed protuberances were raised 0.027 inch above the surface plane of the original paper sheets and constituted 39% of the total surface area.

Polyvinyl alcohol adhesive, prepared according to the procedure of Example I, was then applied to the distal surfaces of the embossed protuberances on the lower embossed paper sheet as the embossed paper sheet remained in traveling arcuate contact with the engraved steel protuberances of the embossing roll. The application of polyvinyl alcohol adhesive was accomplished with a three roll pick-up and metering system composed of rubber covered rolls as illustrated in FIGURE 1 of the drawings. The adhesive applicator roll was driven at the speed of the paper sheet and cleared the embossing pattern on the steel roll by 0.0015 inch, so that the distal surfaces of the protuberances embossed in the paper were just contacted. 0.01 pound of the polyvinyl alcohol adhesive was applied to the distal surfaces of the embossed paper sheets, remaining in arcuate contact on the embossed paper sheet.

After the adhesive application, the upper and lower embossed paper sheets, remaining in arcuate contact on the identically patterned embossing rolls were brought into contact in the nip formed by the two steel embossing rolls so that the distal surfaces of the embossed protuberances were indexed and adhesively bonded.

After the embossed paper sheets were indexed and adhesively bonded at their indexed distal surfaces they were led to the nip formed by two calendering rolls, forced together with a loading of 60 pounds per linear inch. One of these calendering rolls was a felt covered steel roll; the other calendering roll was a soft, 32 Durometer A, rubber covered roll. The calendering action provided by the calendering rolls reduced the unloaded caliper of the laminated structure to 0.0520 inch or 76% of the caliper of the laminated structure. The resulting compressible laminated paper structure had a compressive modulus of 785 inch-grams per cubic inch as compared with a compressive modulus of 1150 inch-grams per cubic inch for laminater structure prior to calendering.

The MD/CR HOM values of the laminated paper structure prior to calendering were 192/122, after calendering the MD/CD HOM values were reduced to 130/86.

The compressible laminated paper structure formed by the process of Example II is highly suitable for use as a place mat.

A compressible laminated paper structure prepared according to the process of Example II, with the exception that the embossed paper sheet plies are embossed with a repeating pattern of 16 raised protuberances per square inch and 0.3 pound of the polyvinyl alcohol adhesive are applied to the distal surfaces of the embossed protuberances, will also be suitable for use as a place mat.

Example III

A compressible laminated paper structure was prepared from three paper sheets, each having a basis weight of 10.4 pounds per 3000 square feet. The compressible laminatel paper structure was prepared according to the procedure of Example II with the exception that the embossing rolls used to emboss the two outer paper sheets were pressed together with a force of 175 pounds per linear inch, no adhesive was applied to the distal surfaces of the embossed protuberances on the two outer paper sheets and the third paper sheet was interposed without embossing between the distal surfaces of the embossed protuberances on the two outer paper sheets.

The distal surfaces of the embossed protuberances on the two outer paper plies were raised 0.020 inch above the surface plane of the original paper sheets. The two outer embossed paper sheets, with the third paper sheet interposed between, were adhesively joined to form a laminated paper structure. The adhesive joinder was accomplished by the pressure developed in passing the three sheets between the steel embossing rolls with their distal surface clearance adjusted to 0.0015 inch.

After calendering, the resulting compressible laminated paper structure had a compressive modulus of 490 together with MD/CD HOM values of 18/25.

The compressible laminated paper structure resulting from the process of Example III is suitable for use as a paper towel.

Another compressible laminated paper structure was prepared according to the process of Example III from three paper sheets each having a basis weight of 8.5 pounds per 3000 square feet. The resulting compressible laminated paper structure had a compressive modulus of 320 together with MD/CD HOM values of 26/16.

Example IV

Two paper sheets, each having a basis weight of 10.0 pounds per 3000 square feet, a machine direction tensile strength of 339 grams per inch and a cross-machine tensile strength of 98 grams per inch were selected as plies for use in a compressible laminated paper structure. The paper sheets also had 20% dry-crepe together with a machine direction extensibility to rupture of 16%.

The paper sheets were separately embossed with a raised pattern of discrete embossed protuberances by passing them individually through nips formed by steel embossing rolls and rubber covered embossing rolls mounted as illustrated in FIGURE 1 of the drawings.

In each set of rolls forming the embossing nips, the rubber covered roll had a P&J 1/8" ball hardness of 110 and a diameter of 8.5 inches; the active rubber covering was 0.875 inch thick. The steel embossing rolls had protuberances in a pattern on their surfaces engraved to the dimensions illustrated in FIGURES 2, 3 and 4 of the attached drawings. In each set of embossing rolls the 16 inch diameter steel embossing roll was pressed against the rubber covered roll with a force of 125 pounds per linear inch.

In the foregoing manner the two paper sheets selected as plies were embossed with a repeating pattern of 72 raised protuberances per square inch in the pattern of the embossing roll. The distal surfaces of the embossed protuberances were raised 0.025 inch above the surface plane of the original paper sheets and constituted 39% of the total surface area.

Polyvinyl alcohol adhesive, prepared by heating 2 parts by weight of 99+% hydrolyzed polyvinyl alcohol resin in 98 parts by weight of water, was then applied to the distal surfaces of the embossed protuberances on the lower embossed paper sheet as the embossed paper sheet remained in traveling arcuate contact with the engraved steel protuberances on the embossing roll. The application of polyvinyl alcohol adhesive was accomplished with a three roll pick-up and metering system composed of rubber covered rolls as illustrated in FIGURE 1 of the drawings. The adhesive applicator roll was driven at the speed of the paper sheet and cleared the embossing pattern on the steel roll by 0.0015 inch, so that the distal surfaces of the protuberances embossed in the paper were just contacted. 0.01 pound of the polyvinyl alcohol adhesive was applied to the distal surfaces of the embossed protuberances on 3000 square feet of the paper sheet.

After the adhesive application, the upper and lower embossed paper sheets, remaining in arcuate contact on the identically patterned embossing rolls were brought into contact in the nip formed by the two steel embossing rolls so that the distal surfaces of the embossed protuberances were indexed and adhesively bonded.

After the embossed paper sheets were indexed and adhesively bonded at their indexed distal surfaces they were led to the nip formed by two calendering rolls, forced together with a loading of 6 pounds per linear inch. One of these calendering rolls was a felt covered steel roll; the other calendering roll was a soft, 32 Durometer A, rubber covered roll. The calendering action provided by the calendering rolls reduced the unloaded caliper of the laminated structure to 0.0408 inch or 85% of the caliper of the laminated structure. The resulting compressible laminated paper structure had a compressive modulus of 197 inch-grams per cubic inch as compared with a compressive modulus of 297 inch-grams per cubic inch for the laminated structure prior to calendering.

The MD/CD HOM values of the laminated paper structure prior to calendering were 18/25, after calendering the MD/CD HOM values were reduced to 11/14.

The compressible laminated paper structure formed by the process of Example IV is highly suitable for use as a table napkin.

Having thus described the invention, what is claimed is:

1. A process for the manufacture of a compressible laminated paper structure which comprises the steps of (1) separately embossing each of two extensible paper sheets, each having a basis weight of about 7 to about 30 pounds per 3000 square feet, with identical raised patterns consisting of about 16 to about 200 discrete protuberances per square inch, raised to a height of about 0.010 to about 0.040 inch above the surface of the unembossed paper sheets, (2) adhesively joining the mating distal surfaces of the discrete protuberances on the two extensible paper sheets to form a laminated paper structure and (3) calendering said laminated paper structure to about 50% to about 90% of its formed caliper.

2. The process of claim 1 wherein the distal surfaces of the discrete protuberances are adhesively joined by pressure developed in a nip formed by identical steel embossing rolls.

3. A process for the manufacture of a compressible laminated paper structure which comprises the steps of (1) separately embossing each of two extensible paper sheets, each having a basis weight of about 7 to about 30 pounds per 3000 square feet, a machine direction tensile strength and a cross-machine tensile strength of about 100 to about 1500 grams per inch of paper width and a crepe percentage of about 15% to about 40%, with identical raised patterns consisting of about 16 to about 200 discrete protuberances per square inch, raised to a height of about 0.010 inch to about 0.040 inch above the surface of the unembossed paper sheets, said discrete protuberances constituting about 10% to about 60% of the surface of said extensible paper sheets, (2) applying a total of about 0.01 to about 0.3 pound of adhesive solids per 3000 square feet of adhesively joined extensible paper sheet surface to the distal surfaces of said discrete protuberances, (3) adhesively joining the mating distal surfaces of the discrete protuberances on the two extensible paper sheets to form a laminated paper structure and (4) calendering said laminated paper structure to about 50% to about 90% of its formed caliper.

4. The process of claim 3 wherein a third extensible paper sheet having a basis weight of about 7 to about 30 pounds per 3000 square feet is interposed and adhesively joined between the mating distal surfaces on the two extensible paper sheets in step 3.

5. The process of claim 3 wherein the adhesive solids of step 2 are applied as a liquid formulation prepared by heating about 2 to about 4 parts by weight of substantially completely hydrolyzed polyvinyl alcohol resin in water to make up 100 parts by weight 6. A process for the manufacture of a compressible laminated paper structure which comprises the steps of (1) separately embossing each of two extensible paper sheets, each having a basis weight of about 16 pounds per 3000 square feet, a machine direction and a cross-machine direction tensile strength of about 700 grams per inch of paper width and a crepe percentage of about 15% to about 40%, with identical raised patterns consisting of about 70 discrete protuberances per square inch, raised to a height of about 0.020 inch above the surface of the unembossed paper sheets, said discrete protuberances constituting about 45% of the surface of said extensible paper sheets, (2) applying a total of about 0.03 pound of adhesive solids per 3000 square feet of adhesively joined extensible paper sheet surface to the distal surfaces of said discrete protuberances, (3) adhesively joining the mating distal surfaces of the discrete protuberances on the two extensible paper sheets to form a laminated paper structure and (4) calendering said laminated paper structure to about 60% of its formed caliper.

7. A compressible laminated paper structure, having a basis weight of about 14 to about 90 pounds per 3000 square feet, comprised of at least two but not more than three extensible paper sheets, each having a basis weight of about 7 to about 30 pounds per 3000 square feet, which compressible laminated paper structure is further characterized by having embossed in its two outer extensible paper sheets identical raised patterns consisting of about 16 to about 200 inwardly directed discrete protuberances per square inch, said discrete protuberances constituting about 10% to about 60% of the surface of each of said two outer extensible paper sheets, by having its extensible paper sheets adhesively joined at the mating distal surfaces of said inwardly directed discrete protuberances embossed in the two outer paper sheets with a third extensible paper sheet interposed between and by exhibiting a compressive modulus of about 200 to about 800 together with MD/CD HOM values of about 10 to about 130.

8. A compressible laminated paper structure comprised of two extensible paper sheets, each having a basis weight of about 7 to about 30 pounds per 3000 square feet, which compressible laminated paper structure is further characterized by having embossed in each of said extensible paper sheets identical raised patterns consisting of about 16 to about 200 inwardly directed discrete protuberances per square inch, said discrete protuberances constituting about 10% to about 60% of the surface of each of said extensible paper sheets, by having its extensible paper sheets adhesively joined at the mating distal surfaces of said inwardly directed discrete protuberances and by exhibiting a compressive modulus of about 200 to about 800 together with HOM values of about 10 to about 130.

9. A compressible laminated paper structure comprised of two extensible paper sheets, each having a basis weight of about 16 pounds per 3000 square feet, which compressible laminated paper structure is further characterized by having embossed in each of said extensible paper sheets identical raised patterns consisting of about 70 inwardly directed discrete protuberances per square inch, said discrete protuberances constituting about 45% of the surface of each of said extensible paper sheets, by having its extensible paper sheets adhesively joined at the mating distal surfaces of said inwardly directed discrete protuberances and by exhibiting a compressive modulus of about 400 together with HOM values of about 30.

References Cited
UNITED STATES PATENTS

| | | | |
|---|---|---|---|
| 1,810,930 | 6/1931 | Sieg | 156—586 |
| 2,043,351 | 6/1936 | Fourness et al. | 161—129 |
| 2,179,057 | 11/1939 | Schuetz | 161—127 |
| 2,399,338 | 4/1946 | Ford. | |
| 2,633,430 | 3/1953 | Kellgren et al. | 161—128 |
| 2,978,006 | 4/1961 | Clemens | 156—210 |

MORRIS SUSSMAN, *Primary Examiner.*